Dec. 1, 1925.

J. M. S. ANDERSON

TOASTER

Filed July 17, 1923

1,563,823

Inventor

John M. S. Anderson

By Chamberlain + Newman
Attorneys

Patented Dec. 1, 1925.

1,563,823

UNITED STATES PATENT OFFICE.

JOHN M. S. ANDERSON, OF BRIDGEPORT, CONNECTICUT, ASSIGNOR TO THE GENERAL MACHINE AND MFG. CO., OF BRIDGEPORT, CONNECTICUT, A CORPORATION OF CONNECTICUT.

TOASTER.

Application filed July 17, 1923. Serial No. 652,027.

*To all whom it may concern:*

Be it known that JOHN M. S. ANDERSON, a citizen of the United States, and resident of Bridgeport, in the county of Fairfield and State of Connecticut, has invented certain new and useful Improvements in Toasters, of which the following is a specification.

This invention relates to an improved toaster, more particularly for use with portable stoves, of the type employing "canned heat," or solidified alcohol, as fuel, an object of the invention being to provide a device of this character, which will be of simple construction, and by means of which bread may be toasted rapidly and uniformly. The device is also adapted for use in connection with any ordinary coal or gas stove, as well as with solidified alcohol; in fact, any desired kind of fuel may be used as a heating medium. A further object is to provide a toaster in which the toasting will be effected by radiant heat, rather than direct contact of the flame. To this end it is proposed to provide a toaster having a conical surface, having an imperforate portion at, and surrounding its apex, and provided in radiating relation thereto with a series of jet-like openings, of gradually increasing size toward the periphery, and adapted to direct the heat toward the bread in a uniform manner.

A further object is to provide means adapted to admit air for combustion, in a manner to provide a hot, efficient and non-smoky flame.

With the above and other objects in view, an embodiment of the invention is shown in the accompanying drawings, and this embodiment will be hereinafter more fully described, with reference thereto, and the invention will be finally pointed out in the claims.

In the drawings.

Similar reference characters indicate corresponding parts throughout the several figures of the drawings.

Figure 1:
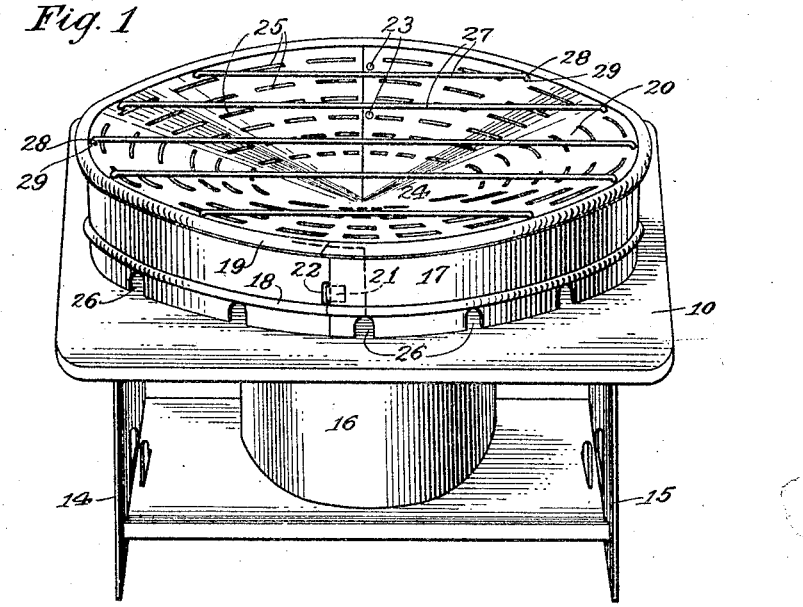
Fig. 1 is a perspective view of the toaster, according to the present embodiment of the invention, and showing the same in place on a stove of the "canned heat" type.
Figure 2:
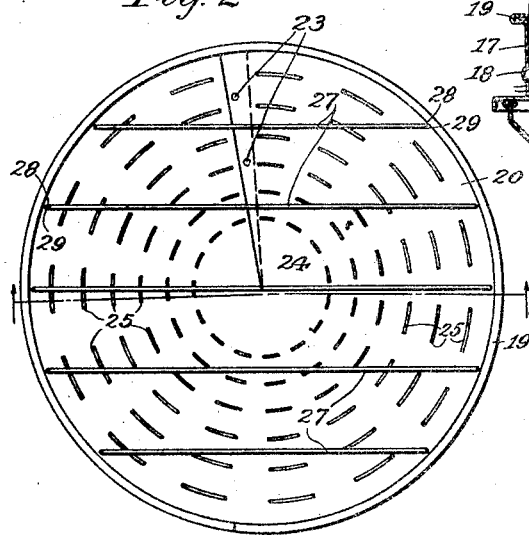
Fig. 2 is a plan view of the toaster.

Referring to the drawings, and more particularly to Fig. 1 thereof, the toaster is especially adapted for use with a portable "canned heat" stove, of the type shown, consisting of an upper plate 10 having a circular raised, or pressed up portion 11, provided with a central circular opening 12, and radial openings 13, and supported upon legs 14 and 15, between which a supporting platform, for the can of solidified alcohol 16, is secured. It will be understood, of course, that the device may be used with other types of stoves.

The toaster consists of a circular upright wall 17, having a circumferential reenforcing bead 18 near its lower edge, and provided at its upper edge with a clamping rim 19, bent outwardly and then inwardly upon itself, and between which the marginal edge of the conical plate 20 is secured.

The wall 17 is formed from a single strip of sheet metal, connected at its ends by means of a tongue 21 at one end, inserted and clamped through an aperture 22 at the other end. The conical plate 20 is also formed from a single flat piece of sheet metal, having a segment cut therefrom, the edges of which are overlapped and riveted together, as at 23, to produce the conical shape.

Figure 3:
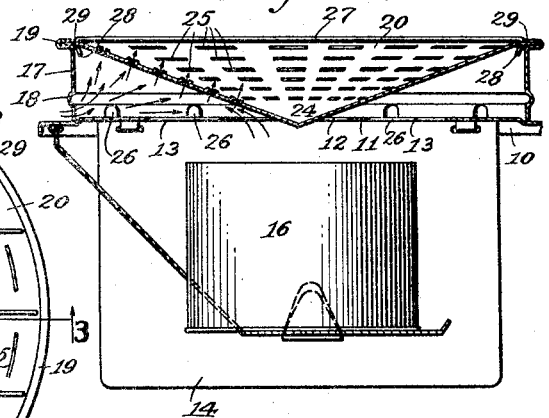
Fig. 3 is a vertical sectional view of tne toaster and stove, taken along the line 3, of Fig. 2.

The cone is of such depth, that its apex is substantially flush with the lower edge of the wall 17, and when resting on the stove, as shown in Fig. 3, it projects into the central hole 12 slightly below the surface of the circular raised portion 11, the wall 17 resting just outside of said raised portion and being positioned thereby.

The central portion 24 of the plate 20 is imperforate, and in radiating relation thereto, there are provided a series of elongated slots or openings 25, of gradually increasing length toward the periphery, the metal surrounding the openings being punched upwardly, so that the heat rays passing therethrough are directed at substantially right angles to the surface of the plate, as shown in Fig. 3, and into uniform relation with the entire surface of the bread.

Air-holes 26 are provided in the lower edge of the wall 17, to supply air for combustion, and to direct the heat to the under surface of the plate, the air entering beneath the flame which envelops the surface of the plate.

The bread rests on a series of parallel wires 27, having their ends 28 inserted and clamped through holes 29 in the marginal portion of the plate 20.

The central imperforate portion 24 of the plate prevents the flame from rising directly into contact with the central portion of the bread, and directs it uniformly over the under surface of the plate, the heat rays then passing through the openings 25, along the lines indicated by the arrows (Fig. 3), into contact with the bread, so that its entire surface is uniformly heated. The gradual enlargement of the openings, and the gradual converging of the surface of the plate toward the periphery of the bread rest, is so proportioned that the heat at the under side, which gradually diminishes toward the periphery, is uniformly distributed to the surface of the bread.

I have illustrated and described a preferred and satisfactory embodiment of the invention, but it is obvious that changes may be made therein, within the spirit and scope thereof, as defined in the appended claim.

Having thus described my invention, what I claim and desire to secure by Letters Patent is:

A toaster comprising an inverted conical plate having a horizontally extending flange at its edge, an upright wall surrounding said plate, said wall being split and having its upper edge bent upon itself to form a clamping rim, said clamping rim receiving the periphery of said flange to support the plate, means for drawing the ends of said wall together to hold said rim and flange in contact, a grid supported above said plate and formed of separate spaced wires having their ends removably anchored in said flange adjacent said clamping rim.

Signed at Bridgeport in the county of Fairfield and State of Connecticut this 13th day of July, A. D. 1923.

JOHN M. S. ANDERSON.